(12) United States Patent
Rosen et al.

(10) Patent No.: US 12,726,136 B2
(45) Date of Patent: Sep. 1, 2026

(54) THREE-LEVEL OR MULTI-LEVEL INVERTER CIRCUIT, ELECTRIC DRIVE SYSTEM AND METHOD

(71) Applicant: DeepDrive GmbH, Garching bei Munich (DE)

(72) Inventors: Alexander Rosen, Osnabrueck (DE); Christopher Roemmelmayer, Fuerstenfeldbruck (DE); Maximilian Habersbrunner, Munich (DE)

(73) Assignee: DeepDrive GmbH, Garching bei Munich (DE)

( * ) Notice: Subject to any disclaimer, the term of this patent is extended or adjusted under 35 U.S.C. 154(b) by 207 days.

(21) Appl. No.: 18/573,531

(22) PCT Filed: Jul. 14, 2022

(86) PCT No.: PCT/EP2022/069787
§ 371 (c)(1),
(2) Date: Dec. 22, 2023

(87) PCT Pub. No.: WO2023/006441
PCT Pub. Date: Feb. 2, 2023

(65) Prior Publication Data

US 2024/0291396 A1 Aug. 29, 2024

(30) Foreign Application Priority Data

Jul. 29, 2021 (DE) ..................... 10 2021 003 941.6

(51) Int. Cl.
*H02M 7/483* (2007.01)
*B60L 50/51* (2019.01)
(Continued)

(52) U.S. Cl.
CPC ............ *H02M 7/487* (2013.01); *B60L 50/51* (2019.02); *H02M 7/53871* (2013.01); *B60L 2210/42* (2013.01)

(58) Field of Classification Search
CPC .. H02M 7/483; H02M 7/487; H02M 7/53871; H02P 27/14
See application file for complete search history.

(56) References Cited

U.S. PATENT DOCUMENTS 5,982,070 A 11/1999 Caamano
8,541,923 B2 9/2013 Leiber et al.
(Continued)

FOREIGN PATENT DOCUMENTS

CN 104253464 A 12/2014
CN 112740526 A 4/2021
(Continued)

OTHER PUBLICATIONS

Translation of Japanese Office Action for corresponding Japanese Patent Application No. 2024-505538, 7 pages, dated Aug. 5, 2025.
(Continued)

*Primary Examiner* — Sisay G Tiku
(74) *Attorney, Agent, or Firm* — Westman, Champlin & Koehler, P.A.

(57) ABSTRACT

A three-level or multi-level inverter circuit for activation of a multiphase electric machine for an electric drive system, with two supply connections couplable to first and second supply potential of voltage supplies, a load output comprising a load output connection for each phase of the electric machine, a controllable three-level or multi-level inverter between the supply connections and the load output designed to convert a direct voltage received on the supply side into an alternating voltage for driving an electric machine, with an operating mode setting device designed to change the inverter between three-level or multi-level operation and two-level operation in dependence upon overall
(Continued)

efficiency of the electric drive system, wherein the overall efficiency is a function of the detected phase current of the electric machine and at least one further parameter and/or property of the electric machine which influence the overall efficiency.

8 Claims, 5 Drawing Sheets

(51) Int. Cl.
*H02M 7/487* (2007.01)
*H02M 7/538* (2007.01)
*H02M 7/5387* (2007.01)

(56) References Cited

U.S. PATENT DOCUMENTS

| | | | |
|---|---|---|---|
| 10,075,094 B2 | 9/2018 | Sahhary et al. | |
| 10,581,342 B2 | 3/2020 | Zhang et al. | |
| 10,903,758 B2 | 1/2021 | Fu et al. | |
| 11,251,736 B2 | 2/2022 | Vogelsberger et al. | |
| 11,290,003 B2 | 3/2022 | Tsuruma | |
| 11,463,017 B2 | 10/2022 | Drangmeister et al. | |
| 11,682,996 B2 * | 6/2023 | Murakami | H02M 7/5387 318/801 |
| 2008/0142284 A1 | 6/2008 | Qu et al. | |
| 2009/0091204 A1 | 4/2009 | Koshiba et al. | |
| 2012/0007453 A1 | 1/2012 | Leiber et al. | |
| 2012/0133221 A1 | 5/2012 | Leiber et al. | |
| 2012/0155135 A1 | 6/2012 | Fujii | |
| 2014/0233290 A1 | 8/2014 | Spanos et al. | |
| 2015/0108958 A1 | 4/2015 | Xu et al. | |
| 2016/0268950 A1 | 9/2016 | Cho et al. | |
| 2017/0185130 A1 | 6/2017 | Zhang et al. | |
| 2017/0317607 A1 | 11/2017 | Agirman et al. | |
| 2017/0331392 A1 | 11/2017 | Sahhary et al. | |
| 2019/0238062 A1 | 8/2019 | Lu et al. | |
| 2021/0126569 A1 | 4/2021 | Vogelsberger et al. | |
| 2021/0359593 A1 | 11/2021 | Tsuruma | |
| 2022/0014112 A1 | 1/2022 | Drangmeister et al. | |
| 2023/0075792 A1 | 3/2023 | Schafroth et al. | |
| 2023/0104049 A1 * | 4/2023 | Tang | H02P 27/085 318/811 |
| 2024/0063747 A1 * | 2/2024 | Lu | H02P 27/14 |
| 2024/0291396 A1 * | 8/2024 | Rosen | B60L 50/51 |
| 2024/0322726 A1 * | 9/2024 | Rosen | H02P 23/0027 |

FOREIGN PATENT DOCUMENTS

| | | |
|---|---|---|
| CN | 113162350 A | 7/2021 |
| DE | 102013202649 A1 | 8/2014 |
| DE | 202016106881 U1 | 12/2016 |
| DE | 102020108034 B3 | 4/2021 |
| DE | 102021003942 A1 | 2/2023 |
| EP | 1191673 A2 | 3/2002 |
| EP | 1191673 A3 | 8/2002 |
| EP | 3224075 B1 | 9/2018 |
| EP | 3627677 A1 | 3/2020 |
| EP | 3780377 A1 | 2/2021 |
| EP | 3799290 A1 | 3/2021 |
| JP | 2003-299393 A | 10/2003 |
| JP | 2014-87105 A | 5/2014 |
| JP | 5554140 B2 | 7/2014 |
| WO | 2010099976 A2 | 9/2010 |
| WO | 2016065012 A1 | 4/2016 |
| WO | 2020099145 A1 | 5/2020 |
| WO | 2021144885 A | 7/2021 |

OTHER PUBLICATIONS

Communication pursuant to Article 94(3) EPC for European Application No. EP 22 751 700.0-1002 dated Sep. 12, 2024, with machine generated English translation, 3 pages.

Fabio Crescimbini et al.: "High-Speed Generator and Multilevel Converter for Energy Recovery in Automotive Systems", IEEE Transaction on Industrial Electronics, IEEE Service Center, Piscataway, NJ, USA, Bd. 59, Nr. 6, Jun. 1, 2012, pp. 2678-2688, XP011409235, ISSN: 0278-0046, DOI: 10.1109/TIE.2011.2160513, 11 pages.

Cao Libing et al.: "A Double-Rotor Flux-Switching Permanent-Magnet Motor for Electric Vehicles With Magnetic Differential", IEEE Transactions on Industrial Electronics, IEEE Service Center, Piscataway, NJ, USA, Bd. 68, Nr. 2, Jan. 29, 2020, pp. 1004-1015, XP011817849, ISSN: 0278-0046, DOI: 10.1109/TIE.2020.2969101, 12 pages.

German Search Report for German Application No. EP 22 751 700.0, dated Sep. 12, 2024, 10 pages.

Translation of Korean Office Action for corresponding Korean Application No. 10-2023-7042095, dated Apr. 18, 2025, 25 pages.

International Search Report (including English translation) and Written Opinion for International Application No. PCT/EP2022/069787, dated Mar. 14, 2023.

Office Action, including Search Report, for German Patent Application No. 10 2021 003 941.6, dated Jul. 19, 2022, 24 pages.

Deboy, Gerald, and Peter Friedrichs, "Using technologies correctly—Future trends in the selection of power semiconductor components," Markt&Technik, Trend-Guide Leistungselektronik, 2019, p. 6ff, https://www.infineon.com/dgdl/Infineon-Zukuenftige_Trends_bei_der_Wahl_von_Leistungshalbleiter-Bauelementen-Article-v01"00-EN.pdf?fileId=5546d4626da6c043016dd4b283615793, accessed on Jul. 18, 2022.

Sezen, S. et al., " A Three-Phase Three-Level NPC Inverter Based Grid-Connected Photovoltaic System With Active Power Filtering," 16th International Power Electronics and Motion Control Conference and Exposition, Antalya, Turkey Sep. 21-24, 2014.

Salem, A. et al., "T-Type Multilevel Converter Topologies: A Comprehensive Review," Review Article—Electrical Engineering, Arabian Journal for Science and Engineering, https://doi.org/10.1007/s13369-018-3506-6, Aug. 24, 2018.

Bubert, A. et al., "Experimental Validation of Design Concepts for Future EV-Traction Inverters," Institute for Power Electronics and Electrical Drives, IEEE, 2018.

Häring, J. et al., "Efficiency and cost comparison of B6 and Hybrid ANPC Converters for Traction Drives," Efficiency and Cost Comparison of B6 and Hybrid ANPC Converters for Traction Drives, ISBN: 978-9-0758-1536-8, IEEE, 2020.

Hoeck, H. et al., "Power Electronic Architectures for Electric Vehicles," DOI: 10.1109/EMOBILITY.2010.5668048, Nov. 2010.

Lu, J. et al., "A GaN/Si Hybrid T-Type Three-Level Configuration for Electric Vehicle Traction Inverter," 2018, IEEE.

Liu, H. et al., "A Comparative Analysis of the Three-Level NPC and ANPC Converter Loss Distribution," J. Electrical Systems 11-3 (2015): 271-280.

Zhu, J. et al., "High Efficiency SiC Tration Inverter for Electric Vehicle Applications," Department of Electrical, Computer and Energy Engineering, 2018, IEEE.

Nitzsche, M. et al., "Comprehensive Comparison of a SiC MOSFET and Si IGBT Based Inverter," 2019.

Schweizer, M. et al., "Comparative Evaluation of Advanced Three-Phase Three-Level Inverter/Converter Topologies Against Two-Level Systems," IEEE Transactions on Industrial Electronics, vol. 60, No. 12, pp. 5515-5527, Dec. 2013.

Mukheriee, N. et al., "900V GaN-based sine-wave inverters for three-phase industrial applications," The Journal of Engineering, The 9th International Conference on Power Electronics, Machines and Drives (PEMD 2018), doi: 10.1049/joe.2018.8032.

Baek, S. et al., "Performance Comparison Between Two-Level and Three-Level SiC-Based VFD Applications with Output Filters," IEEE Transactions on Industry Applications, vol. 55, No. 5, Sep./Oct. 2019.

Translation of Japanese Office Action for corresponding Japanese Patent Application No. 2024-505538, 10 pages, dated Feb. 19, 2026.

Copy and Translation of Chinese Office Action for corresponding Chinese Patent Application No. 202280037481.6, 18 pages, dated Jun. 12, 2026.

(56) References Cited

OTHER PUBLICATIONS

Copy and Translation of Korean Office Action for corresponding Korean Application No. 10-2023-7042095, dated May 22, 2026, 21 pages.

* cited by examiner

THREE-LEVEL OR MULTI-LEVEL INVERTER CIRCUIT, ELECTRIC DRIVE SYSTEM AND METHOD

CROSS REFERENCE TO RELATED APPLICATION(S)

This application is a Section 371 National Stage Application of International Application No. PCT/EP2022/069787, filed on Jul. 14, 2022, entitled "Three-level or multi-level inverter circuit, electric drive system and method", which published as WIPO Publication No. 2023/006441 A2, on Feb. 2, 2023, not in English, which claims priority to German Patent Application No. 10 2021 003 941.6, filed on Jul. 29, 2021, the contents of which are incorporated herein by reference in their entireties.

FIELD OF THE INVENTION

The present invention relates to a three-level or multi-level inverter circuit for activation of a multiphase electric machine for an electric drive system, in particular a synchronous machine equipped with a double rotor with flux-carrying material consisting of solid material. The present invention further relates to an electric drive system for or in a motor vehicle and a method for operating such an electric drive system.

TECHNICAL BACKGROUND

An inverter is an electric apparatus which converts direct voltage into alternating voltage. Such inverters are used e.g. in modern motor vehicles, in photovoltaics (solar inverters), as components in frequency converters and many other applications, in which a suitable alternating voltage is to be generated from a direct voltage. Such inverters and the fields of application thereof are generally known in a wide range of circuitry-wise variants, and so it is not necessary to discuss the circuitry-wise structure and mode of operation thereof in greater detail.

In the case of modern motor vehicles, electrically powered drive systems are increasingly being used-inter alia also for reasons of sustainability and to avoid CO2 emissions. Such drive systems include e.g. one or more electric machines, such as for instance synchronous machines or asynchronous machines, which are powered by means of a multiphase alternating voltage. In general, in order to generate the alternating voltage, so-called two-level inverters (or 2L inverters for short) are used. In the case of two-level inverters, an alternating voltage having two voltage levels is generated from the direct voltage of a direct voltage source.

Two-level inverters have become established over other inverter topologies, in particular in the field of drive inverters for electric vehicles. At the present time, IGBT switching elements are used predominantly in two-level inverters. An example of such a two-level inverter is described e.g. in the paper by H. v. Hoeck, "Power Electronic Architectures for Electric Vehicle" which appeared in the book "Emobility—Electrical Power Train" published by IEEE in 2010.

In addition to the two-level inverter topology just mentioned, three-level or multi-level inverter topologies also exist, by means of which three-level or multi-level voltage levels can thus be generated. Examples of multi-level inverter topologies are described e.g. in U.S. Pat. No. 10,903,758 B2 or US 2017/0185130 A1.

The advantages of multiple voltage levels are lower harmonics, a slower voltage change at the phase outputs, low electromagnetic emissions (EME) and, above all, the processing of higher voltages. For these reasons, such three-level or multi-level inverters are currently used primarily for high-voltage applications. Power engineering applications, such as e.g. solar inverters or wind turbines, are established fields of application for such three-level or multi-level inverter topologies. Higher voltages are not to be found in electric vehicles (with voltages of e.g. 400 V). In contrast, in photovoltaics, voltages of more than 1 kV are common, and in the case of other renewable energies, such as wind energy, the voltages are significantly higher.

However, the advantages of three-level or multi-level inverters just mentioned are not sufficient, according to the prevailing opinion, to justify the use thereof in electric drives of electric vehicles, as stated in the article by Andreas Bubert et. al, "Experimental Validation of Design Concepts for Future EV-Traction Inverters", 2018 IEEE Transportation Electrification Conference and Expo (ITEC), pages 795-802. For all of these reasons, three-level or multi-level inverter topologies are not used in electrically driven motor vehicles today.

SUMMARY OF THE INVENTION

The present invention is intended to provide a three-level or multi-level inverter which is suitable for efficient use in electric drive systems of motor vehicles. In particular, the present invention is further optionally intended to improve the efficiency of an electric drive system equipped with a double rotor made from flux-carrying material consisting of solid material and/or to make possible a better cost/benefit ratio compared to two-level inverters.

In accordance with the invention, an inverter circuit, an electric drive system and a method having the features of the independent claims are provided.

Accordingly, the following is provided:

A three-level or multi-level inverter circuit for activation of a multiphase electric machine for an electric drive system, in particular a synchronous machine equipped with a double rotor with flux-carrying material consisting of solid material, with two supply connections which can be coupled to a first and a second supply potential of a voltage supply, with a load output which comprises a load output connection for each phase of the electric machine and which can be coupled to the electric machine, with a controllable three-level or multi-level inverter disposed between the supply connections and the load output, which inverter is designed to convert a direct voltage received on the supply side into an alternating voltage for driving an electric machine connected to the load output, with an operating mode setting device which is designed to change the inverter from three-level or multi-level operation to two-level operation and vice versa in dependence upon an overall efficiency of the (whole) electric drive system, wherein the overall efficiency is a function of the detected phase current of the electric machine and at least one further parameter and/or one further property of the electric machine which influence the overall efficiency.

An electric drive system for or in a motor vehicle, with at least one multiphase electric machine which comprises a synchronous machine with a double rotor, wherein the double rotor is constructed from flux-carrying material consisting of solid material, with a three-level or multi-level inverter circuit, in particular a three-level or multi-level inverter circuit in accordance with the invention, which is coupled to the electric machine at a load output and which is designed to convert a direct voltage received on the supply side into an alternating voltage, via which the electric machine can be driven via the load output, wherein the inverter circuit has a controllable three-level or multi-level inverter.

A method for operating an electric drive system which comprises a synchronous machine equipped with a double rotor, wherein the double rotor is constructed from flux-carrying material consisting of solid material, in particular for operating an electric drive system in 20 accordance with the invention, wherein the synchronous machine can be operated by means of a controllable three-level or multi-level inverter in dependence upon an overall efficiency of the electric drive system both in a three-level or multi-level operating mode and also in a two-level operating mode, wherein the overall efficiency is determined from the detected phase current of the electric machine and at least one further parameter and/or one further property of the electric machine which influence the overall efficiency.

The present invention is based on the finding that at present essentially two-level inverters are used in electric drives for motor vehicles. Three-level or multi-level inverters are currently mostly to be found in non-automotive (high-voltage) applications. The additional benefit inherent in the use of three-level or multi-level inverters does not, so far, justify the inherent additional costs in automotive applications.

The present invention solves this problem by the use of a specific inverter circuit associated with an adaptation of the entire drive system, which allows an increase in the overall benefit but without an increase in costs being associated therewith.

A (first) idea of the present invention resides in the use of a novel controllable three-level or multi-level inverter which can be operated in three-level or multi-level operation (hereinafter referred to as 3L operation) and in two-level operation (hereinafter referred to as 2L operation). An operating mode setting device provided specifically for this purpose sets the respective operating mode by activating the power switches of the inverter in a suitable manner. The operating mode is set according to the overall efficiency of the entire drive system—and thus not for instance merely on the basis of the electric machine and/or the inverter used. For the overall efficiency, in addition to the detected phase current of the electric machine—as also with other inverters—further parameters and/or properties of the electric machine which influence the overall efficiency are additionally also taken into consideration. In the case of known drive systems, the latter is not taken into consideration at all for the assessment of efficiency and analysis of efficiency. In accordance with the invention, a holistic analysis of efficiency is performed in this case.

It is now the concept of the present invention to reduce the losses primarily for small loads by operating the inverter in this case in 3L operation. In this case, the losses of the inverter are at most increased insignificantly or even reduced in all operating points. The overall efficiency of the drive system, i.e. the inverter and the electric machine, thus increases significantly, in particular when used in electrically driven vehicles.

A (second) idea of the present invention resides in the use of a specific electric machine which is equipped with a double rotor consisting of solid rotor material, i.e. in a solid construction. In particular, such electric motors involve high losses. The present invention solves the problem of high losses in the double rotor consisting of solid material in known electric machines. It is the basic finding in this case that electric machines having a double rotor consisting of solid material have high losses in the rotor. In design terms, the losses in the electric machine cannot be reduced or can only be reduced insignificantly. Reducing the losses by increasing the frequency in 2L operation has only a slight effect and increases the losses in the inverter, which, turn, influences the overall efficiency. The basic mechanism for reducing the losses in the solid material of the double rotor is based on the fact that the amplitude of the particular magnetic flux density in the solid material of the double rotor which does not contribute to torque formation should be reduced. This portion which is defined by harmonics in the flux density is approximately directly proportional to the change in THD-induced losses in the square of its amplitude. Thus, a change in the inverter switching frequency leads to an indirectly proportional linear change in the losses and is therefore less effective. A reduction in losses in the solid material contributes substantially to the reduction in the overall losses of the electric machine and to economical usage thereof. Thus, the resulting finding, which is part of the present invention, is that the losses in the electric machine can be effectively reduced by means of an inverter circuit which reduces exclusively the amplitude of the harmonics in the flux density.

In order to achieve this, the following measures and aspects were considered in the configuration and selection of the mode of operation of the inverter:

The function of the 2L inverter is replaced by the function of a 3L inverter in order to reduce the harmonics at the phase outputs of the inverter. As a result, the harmonics in the flux density and in the stator current are reduced. A change in frequency is not necessary for this purpose.

The losses are likewise reduced by increasing the switching frequency in 2L operation but this is not carried out because, as a result, the switching losses in the inverter would likewise greatly increase and therefore the overall efficiency is not significantly improved. Although an increase in the switching frequency could positively support the loss optimisation, it is not an essential aspect thereof.

The 3L inverter used offers three voltage levels (3L) and is preferably (but not necessarily) three-phase. A relatively high cost efficiency can be achieved with three voltage levels and three phases. However, the system can be extended to any number of phases and to any number of voltage levels with all phases being of the same design.

In contrast to known 2L inverters, the power losses in the electric machine are greatly reduced in the operation of a 3L inverter in accordance with the invention by reason of the lower harmonics. The switching losses of the 3L inverter are likewise comparatively reduced, but the conducting state losses are increased.

Both in the electric machine and in the 3L inverter, the prevailing loss mechanisms change in dependence upon the load. In 3L operation, the harmonics are lower, and so the machine losses are greatly reduced. Losses induced by harmonics are dominant in the case of low currents. In the case of larger currents, the prevailing loss mechanism changes and resistive conduction or copper losses dominate, whereas losses induced by harmonics are more likely to be subordinate or turn out to be comparatively low. Switching losses in the inverter are reduced in the 3L inverter in comparison with 2L inverters (approximately by 50%). In the case of small loads (currents), these switching losses prevail, whereas in the case of larger currents conduction losses dominate and 2L operation is more efficient. These findings lead to the inventive concept of using a 3L inverter in the case of low loads and of using a 2L inverter in the case of high loads. This operation is possible by means of the controllable three-level or multi-level inverter in accordance with the invention.

Overall, the advantages of 2L operation can thus be combined with the advantages of 3L operation—above all in the case of electric machines equipped with double-rotor motors—in order to significantly improve the overall efficiency of the electric drive system compared to known electric drive systems.

It is essential that the operating mode setting device does not necessarily perform a hard switch from 2L operation to 3L operation and vice versa. On the contrary, it would also be feasible if such a switch-over occurred successively instead, e.g. in that fading from the inner power switches to the outer power switches takes place. This fading can be performed e.g. taking into consideration the average current values of the different power switches, so that the operating times or the times when the respective power switches are switched on are taken into consideration. In addition or alternatively, it would also be feasible if the power switches are switched according to a specified sequence and/or slowly.

The operating mode setting device, which has e.g. an evaluation device, a control device and/or measuring devices, can be designed e.g. as a program-controlled device, such as for instance as a microprocessor or microcontroller. However, it would also be feasible to have a logic circuit, such as for instance an FPGA, PLD or the like, for this function.

Advantageous embodiments and developments are apparent from the further dependent claims and from the description with reference to the figures of the drawing.

According to an aspect, the operating mode setting device has an evaluation device. The evaluation device is designed to optimise the overall efficiency of the electric drive system on the basis of the phase current and on the basis of the at least one further parameter and/or the at least one property of the electric drive system.

Typically, but not necessarily, the overall efficiency is calculated numerically by the evaluation circuit. In addition or alternatively, the overall efficiency can be determined on the basis of a specified family of characteristics which is mapped e.g. in a lookup table. The determination of the overall efficiency can be calculated or determined during operation or e.g. in advance. Preferably, in a so-called offline operation the optimum, i.e. most efficient possible operating strategy is calculated, e.g. numerically, before the operation of the electric drive system. This can be achieved with comparatively few computer resources and is to be preferred above all when a large number of parameters are taken into consideration in the numerical projection of the optimum overall efficiency. In addition, for the offline operation more time is available for the calculation. Alternatively, however, a very dynamic determination of the respective operating mode (2L operation or 3L operation) would also be feasible and possible in a so-called real-time operation, e.g. via a lookup table. This is particularly advantageous and possible if a smaller number of parameters are used for the overall efficiency calculation. For example, for these purposes it would be possible to use a trained artificial network which has been trained on the basis of previous parameter values, characteristic curves and the like.

According to an aspect, the evaluation device has an optimisation module which is designed to initially determine the overall efficiency. Alternatively or additionally, the overall efficiency can subsequently be optimised via an optimisation function, taking into consideration the phase current as well as the at least one further parameter and/or property. The optimisation of the overall efficiency can be effected analytically and/or via a suitable lookup table which has been generated e.g. beforehand.

At least one of the following parameters is provided as a further parameter:

temperature of the inverter circuit;
temperature of the electric machine;
intermediate circuit voltage of the inverter;
rotor speed or rotor rotational speed;
torque of the electric machine;
degree of modulation
phase voltage or phase current.

Of course, it would also be feasible to use further parameters.

The operating mode used in each case (e.g. 2L operation or 3L operation) would be e.g. a property of the electric machine influencing the overall efficiency. A further property can be seen in the specific configuration of the rotor of the electric machine, for instance in the way that the rotor is a double rotor and/or that the double rotor is formed from flux-carrying material consisting of solid material.

According to an aspect, the operating mode setting device has at least one measuring device:

A first measuring device has at least one sensor input, via which the first measuring device can be coupled to the electric machine. The first measuring device is designed to detect the phase current, the temperature, the rotor speed and/or other measurable parameters. For example, the temperature of the electric machine or the rotor thereof can be detected via corresponding thermocouples. Alternatively, the change in the temperature-dependent electrical resistance of specific conductors and semiconductors or for instance specific semiconductor circuits can be used for temperature measurement in order to generate a voltage proportional to the absolute temperature (keyword: band gap reference). Although the torque of the electric machine cannot be detected directly, it can be calculated, inter alia, by measuring the phase current. The rotational speed of the rotor and therefrom the rotor speed can be determined in various ways, e.g. using a Hall sensor or an incremental encoder attached to the rotor.

A second measuring device is arranged and designed in order to detect the temperature and/or the intermediate circuit voltage of the inverter. The temperature detection can be performed in a similar manner to the manner above in relation to the first measuring device.

According to an aspect, the inverter includes a t-type neutral point clamped (TNPC) inverter architecture. They have a variety of advantages over multi-level active neutral point clamped (ANPC) inverter topologies: in contrast to ANPC topologies, not four, but a maximum of three switches are conductive in series and thus the conducting state losses are lower. The output voltage waveforms are identical, which leads to similarly low switching losses, but at higher switching frequencies (e.g. >10 kHz), the required total chip area of the TNPC topology is less compared to the two-level topology. Similar to ANPC, a hybrid inverter topology can be constructed for TNPC in order to further increase the efficiency and/or optimise the production costs. For example, different switch technologies can be used for this purpose in the zero potential or middle bridge branch. Especially in the case of a TNPC inverter constructed completely with insulated gate bipolar transistors (IGBTs), the losses can be drastically reduced using gallium nitride (GaN). A use of the hybrid TNPC inverter topology in motor controls also in electric vehicles is possible, but is not found in practice.

TNPC-based 3L inverters can be operated in two operating modes in order to increase system efficiency. In the case of 3L TNPC inverters, the zero potential (middle) bridge branches can be switched off in order to operate in 2L operation, and are switched on in order to change to 3L operation. A switch is made between the two operating modes in order to increase the degree of system efficiency. For this purpose, the load is measured in the control and regulating logic and a switch is made between 2L and 3L operation with the aid of a previously determined optimisation characteristic curve.

In addition or alternatively, TNPC-based 3L inverters are designed asymmetrically in order to reduce the costs of the inverter. The asymmetry relates to the current-carrying capability of the zero-potential (middle) bridge branches which is less than that of the outer bridge branches. This is possible because the zero-potential bridge branches are no longer used in the case of higher loads in order to optimise the overall efficiency. The outer bridge branches are designed for peak currents and the zero-potential bridge branches are designed for small or continuous currents.

According to an aspect, the inverter has a first driver level and at least one second driver level. The second driver level is designed to carry output load currents to the load output which are smaller than the output load currents provided by the first driver level.

The operating mode switch-over device may be designed to control the inverter in such a manner that, depending upon the overall efficiency, the first driver level and the second driver level are activated in three-level or multi-level operation and at least one of the driver levels, preferably the inner, second driver level, is deactivated in two-level operation.

Typically, but not necessarily, the first driver level has at least one bridge circuit, in particular a half-bridge circuit, of which the centre tap forms the output load connection of the inverter circuit. Each bridge circuit has at least one first (semiconductor) power switch which is connected to a first supply connection (to which e.g. a positive supply potential is applied) and which is designed to provide a first voltage level at the load output. Furthermore, each bridge circuit has at least one second (semiconductor) power switch which is connected to a second supply connection (to which e.g. a negative supply potential or a reference potential is applied) and which is designed to provide a second voltage level at the load output. The semiconductor-based power switches can be produced with various semiconductor materials which can be selected arbitrarily. Typically used materials are Si (silicon) for IGBTs and MOSFETs, SiC (silicon carbide) for MOSFETs and GaN (gallium nitride) for MOSFETs.

Typically, but not necessarily, the second driver level has at least one third power switch, of which the load paths are connected in series between an intermediate circuit and the centre tap of the first driver circuit. The power switches of the second driver level are designed to provide a third voltage level at the load output, said voltage level being between the first and the second voltage level.

In the case of a so-called homogeneous inverter topology, all power switches of the inverter, i.e. the power switches of the first driver level and/or the second driver level, are designed as semiconductor switches of the same switch type and/or the same semiconductor technology. Switch types are e.g. bipolar transistors, field-effect transistors (such as MOSFETs, JFETs, etc), thyristors, IGBTs, etc. . . . The term 'semi-conductor technology' includes semi-conductor technology which is used as a basis for the production of power switches such as for instance an Si, SiC, GaAs, or GaN technology basis.

In a first variant of the homogeneous inverter topology, the semiconductor switches are designed as GaN power switches, e.g. as GaN MOSFET. In a second variant, the semiconductor switches are designed as SiC power switches, in particular as SiC MOSFETs. Furthermore, IGBT-based power switches, e.g. silicon-based IGBTs with an Si diode or SiC diode, are likewise feasible.

In the case of a so-called hybrid inverter topology, at least two different switch types and/or at least two different semiconductor technologies are provided for the semiconductor switches of the inverter, i.e. for the semiconductor switches of the first driver level and/or for the semiconductor switches of the second driver level. In the case of the hybrid inverter topology, the same semiconductor materials are not used for all power switches within the inverter. In particular, a different technology (different switch types) is used for the power switches of the zero-potential bridge branch, i.e. for the second driver level, than is used for the outer switches of the first driver level. Therefore, it is possible to achieve efficiency advantages as a result of reduced switching losses and conduction losses. In addition, cost advantages are also achieved. It is particularly recommended to optimise the power switches in the zero-potential bridge branches (second driver level) for low switching losses and the lowest possible reverse recovery losses. This is expedient because the zero-potential bridge branches (second driver level) are activated in the case of low currents and low reverse recovery losses also reduce the switching losses in the outer switches. A hybrid design is to be particularly recommended if the inverter is designed asymmetrically. The lower the current-carrying capability of the zero-potential bridge branches (second driver level), the lower the additional costs for switching loss-optimised switches.

In a first variant, the semiconductor switches of the first driver level are designed as IGBTs (silicon or SiC) having a free-wheeling diode. In this case, the semiconductor switches of the second driver level can be designed preferably as SiC power switches, in particular as SiC MOSFETs.

In a second variant, the semiconductor switches of the first driver level are designed as SiC MOSFETs. In this case, the semiconductor switches of the second driver level can be designed as GaN-based MOSFETs.

In a third variant, the semiconductor switches of the first driver level are designed as IGBTs having a free-wheeling diode. In this case, the semiconductor switches of the second driver level can be designed as GaN power switches, in particular as GaN MOSFETs.

According to an aspect, the flux-carrying material in the rotor consists of iron or an iron alloy. Electric rotary field machines—and in this case preferably synchronous machines having a double rotor—can be designed with flux-carrying material in the rotor in a solid design, i.e. consisting of solid material. This can be substantiated by the fact that, in an idealised view of synchronous machines, no periodic relative movement takes place between the direction vector of the rotating field generated by the stator winding and the double rotor. The magnetic flux density in an operating point is thus constant and no iron losses occur in the material. In the case of such permanent magnet-excited machines, of which the magnets are mounted on the rotor surface, the distance between the inductor grooves and the flux-carrying material ensured thereby allows the use of solid material without an increase in additional losses.

According to an aspect, the electric machine has a stator with an inductor, wherein the inductor is designed to carry a primarily radial magnetic flux, in particular in order to avoid magnetic flux carrying in a tangential direction. This is therefore a so-called "yokeless" design of the stator which avoids, in particular, magnetic flux carrying in a peripheral direction. A magnetic back iron in the inductor is not required, whereby weight and iron losses are reduced.

According to an aspect, the inductor of the stator has a radial yoke thickness which is less than 30%, preferably less than 20%, particularly preferably less than 10% of an overall radial inductor thickness. In the case of a so-called "yokeless" design, a mechanical connection of the inductor teeth is nevertheless provided in this manner, which, however, would not be electromagnetically necessary and via which no functionally relevant magnetic flux takes place either. The term "yokeless" thus relates to the electromagnetic design of the inductor.

According to an aspect, the synchronous machine is a three-phase synchronous machine. In this case, the inverter circuit is preferably designed at least as a three-phase inverter. It is also a finding of the present invention that synchronous machines which use a three-level or multi-level inverter topology demonstrate a substantially improved overall efficiency of the drive system.

According to an aspect, the electric machine is designed as a wheel hub motor for an electrically operable motor vehicle. A wheel hub motor is an electric machine which is installed directly into a wheel and in particular into the hub of a vehicle and at the same time supports the wheel hub. A part of the hub motor transmits the generated torque directly to the wheel which is to be driven and with which it revolves. Inner rotor and also outer rotor motors can also be considered in the case of electric wheel hub motors. The main advantage of such electric wheel hub motors in vehicles compared to drive concepts having a central motor is the elimination of the classic drive train including the components required in each case according to specification (transmission, cardan shaft, differential gear, drive shaft, etc.). Since their transmission losses are also eliminated, there are potentials for increasing the degree of efficiency of the entire drive system. Efficient recuperation, i.e. recovery of electrical energy during braking of the vehicle, can also be implemented in an electric wheel hub motor.

The above embodiments and developments can be combined with each other in any manner if it is useful to do so. Further possible embodiments, developments and implementations of the invention also comprise non-explicitly-mentioned combinations of features of the invention which have been described or will be described hereinafter with reference to the exemplified embodiments. In particular, in this regard a person skilled in the art will also add individual aspects as improvements or complements to the respective basic form of the present invention.

CONTENT OF THE DRAWING

The present invention will be explained in more detail hereinafter with the aid of the exemplified embodiments shown in the schematic figures of the drawings. In the drawing.

Figure 1:
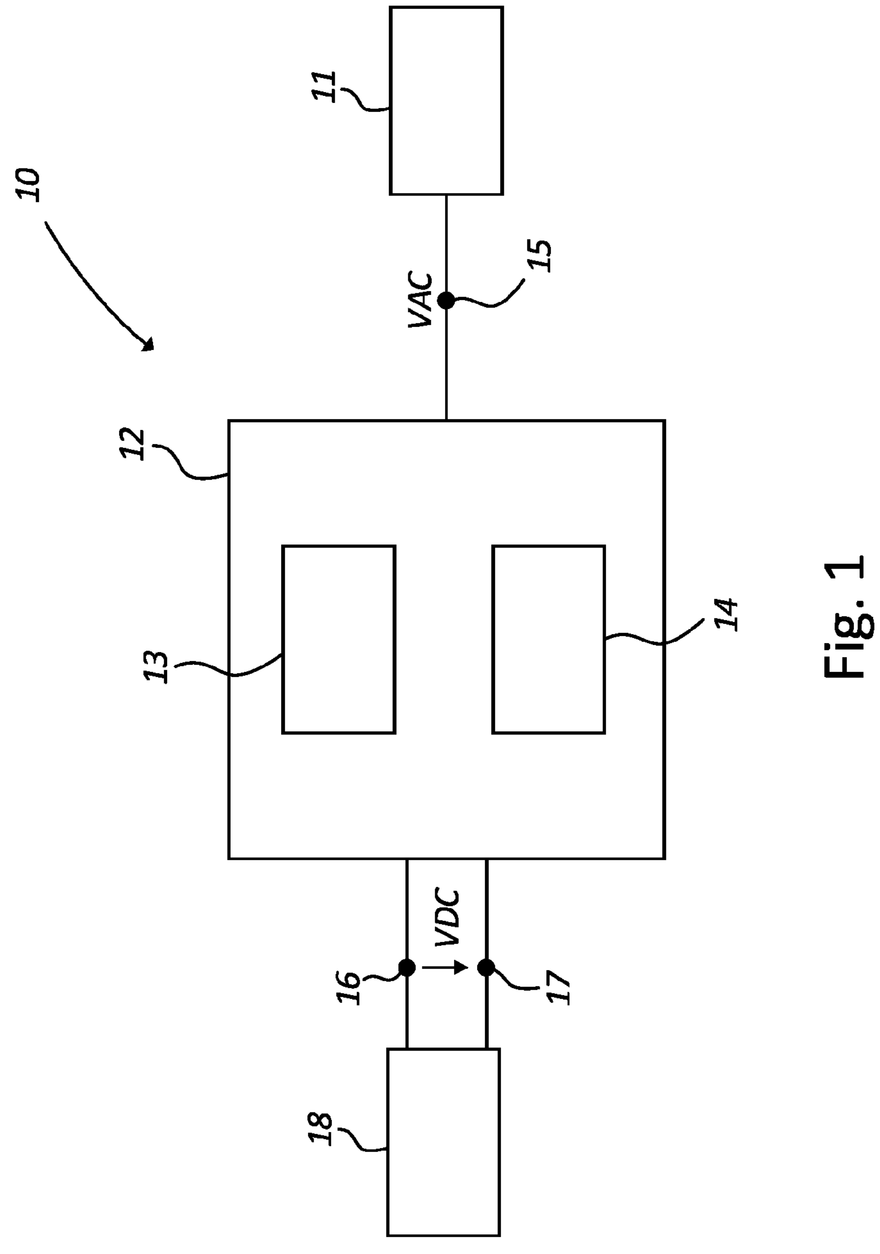
FIG. 1 shows a block diagram of an electric drive system in accordance with an aspect of the invention.

The attached drawings are intended to provide improved understanding of the embodiments of the invention. They illustrate embodiments and are used in conjunction with the description to explain principles and concepts of the invention. Other embodiments and many of said advantages will be apparent in view of the drawings. The elements in the drawings are not necessarily illustrated to scale with respect to each other.

In the figures of the drawing, like and functionally identical elements, features and components and elements, features and components acting in an identical manner are provided with the same reference signs, unless indicated otherwise.

DESCRIPTION OF EXEMPLIFIED EMBODIMENTS

FIG. 1 shows a block diagram of an inventive electric drive system for a motor vehicle.

The electric drive system designated by the reference sign 10 is provided preferably—but not necessarily—for use in a motor vehicle. The drive system 10 comprises at least one multiphase electric machine 11 as well as an inverter circuit 12.

The electric machine 11 is connected on the input side to the inverter circuit 12 which drives the electric machine 11. In accordance with the invention, the inverter circuit 12 is designed as a three-level or multi-level inverter circuit 12. The inverter circuit 12 comprises an inverter 13 and an operating mode setting device 14.

The inverter 13 is coupled to the electric machine 11 via its load output 15 and is coupled to a supply voltage source 18 via supply connections 16, 17. The inverter 13 is designed to convert a direct voltage VDC received on the supply side into an alternating voltage VAC. The inverter 13 is designed as a multiphase inverter 13, wherein the number of phases of the inverter 13 typically corresponds to the number of phases of the electric machine 11. The electric machine 11 is driven via the phase currents provided by the inverter 13 at the load output 15.

In accordance with the invention, the operating mode of the inverter circuit 12 can be set via the operating mode setting device 14 which is coupled on the input side, inter alia, to the electric machine 11. In particular, the operating mode setting device 14 can be used to set whether the inverter 13 operates in two-level operation, in three-level or multi-level operation or in mixed operation. Mixed operation refers to an operating mode, in which the inverter is operated both in two-level operation and three-level or multi-level operation, as can occur e.g. in the event of a transition from one operating mode to the next. The structure and mode of operation of the operating mode setting device 14 will be explained in detail hereinafter with reference to the following FIGS. 3 to 5.

The electric machine 11 is possibly but not necessarily a three-phase synchronous machine 11. In this case, the inverter circuit 12 preferably has a three-phase inverter 13.

It is likewise possible that the electric machine 11 of the electric drive system 10 is a wheel hub motor for an electrically operable motor vehicle. However, other applications are also feasible and advantageous.

Figure 2:
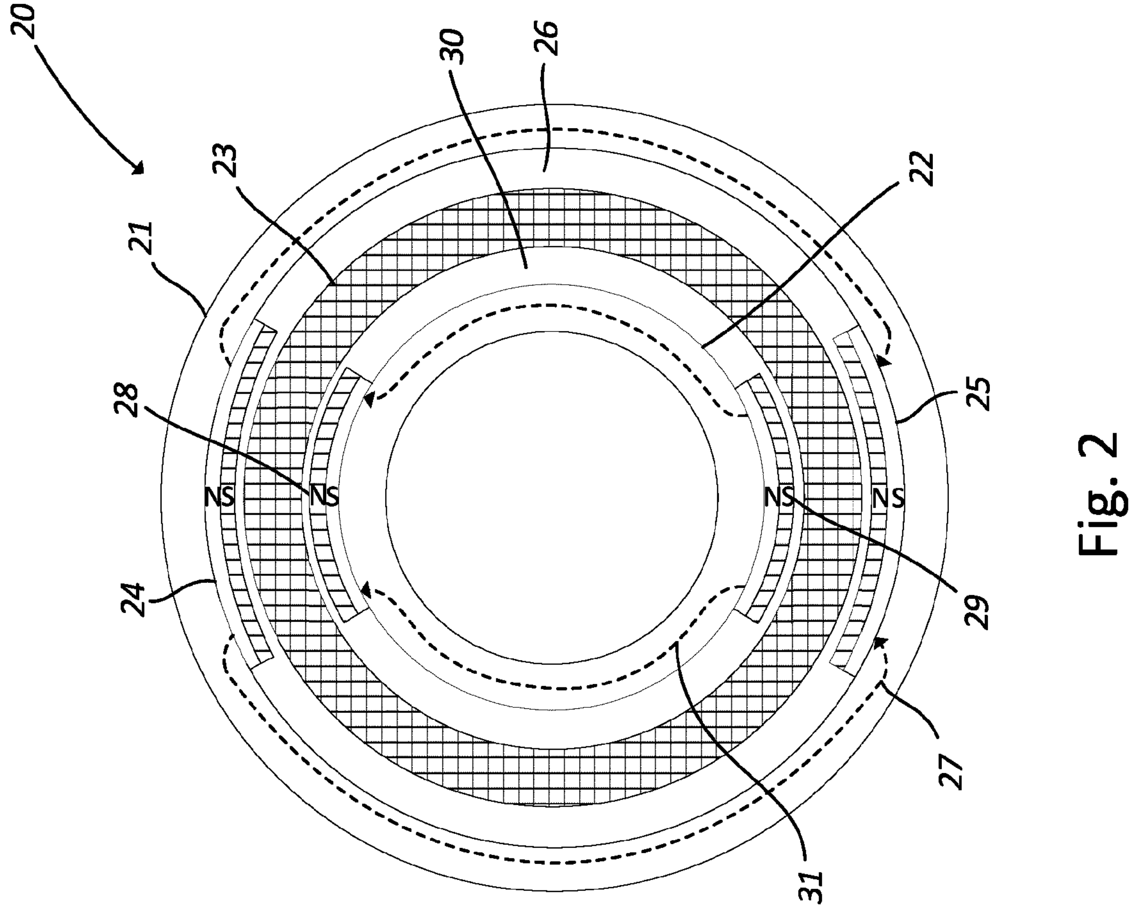
FIG. 2 shows a schematic cross-sectional view f one example of an electric machine of the electric drive system in accordance with an aspect of the invention as shown in FIG. 1.

FIG. 2 shows a schematic cross-sectional view of one example of an electric machine of the electric drive system in accordance with the invention as shown in FIG. 1.

The electric machine 11 is preferably designed as a synchronous machine 11. One aspect which is important but not absolutely necessary to the invention is the circumstance that the synchronous machine or the electric machine 11 is equipped with a double rotor 20 and that, furthermore, the double rotor is constructed from flux-carrying material consisting of solid material. The cross-section of the double-rotor synchronous machine 11 is illustrated in FIG. 2. The double-rotor machine 20 comprises the outer rotor 21 and the inner rotor 22. The stator 23 is arranged between the two rotors 21, 22 in a manner known per se. The stator 23 can be preferably, but not necessarily, a yokeless stator 23.

The outer rotor 21 and inner rotor 22 are preferably not laminated but instead are constructed from solid material. The inner rotor 22 is tubular. However, it would also be feasible for the inner rotor 22 to have a solid, full-volume configuration.

In the example shown, two magnets 24, 25 with opposite poles are placed between the outer rotor 21 and the stator 23 on the inner surface of the outer rotor 21 in the outer air gap 26. However, it would be feasible and advantageous if the magnets 24, 25 are embedded in pocket-shaped recesses of the outer rotor 21 which are provided specifically for this purpose.

However, it would also be feasible if the magnets 24, 25 are spaced apart from the outer rotor 21, i.e. not directly mounted on the inner surface thereof. The flux lines 27 between the north pole and south pole of the magnets 24, 25 with opposite poles extend in this case in the core material of the outer rotor 21.

In the example shown, two magnets 28, 29 with opposite poles are likewise placed between the inner rotor 22 and the stator 23 on the inner surface of the inner rotor 22 in the inner air gap 30. In this case, the magnets 28, 29 can also be embedded into corresponding pockets of the inner rotor 22 or can be spaced apart from the inner rotor 22. The flux lines 31 between the north pole and south pole of the magnets 28, 29 with opposite poles extend in this case in the core material of the inner rotor 22.

The flux-carrying material in the outer and/or inner rotor 21, 22 consists preferably of solid iron or a corresponding solid iron alloy.

Figure 3:
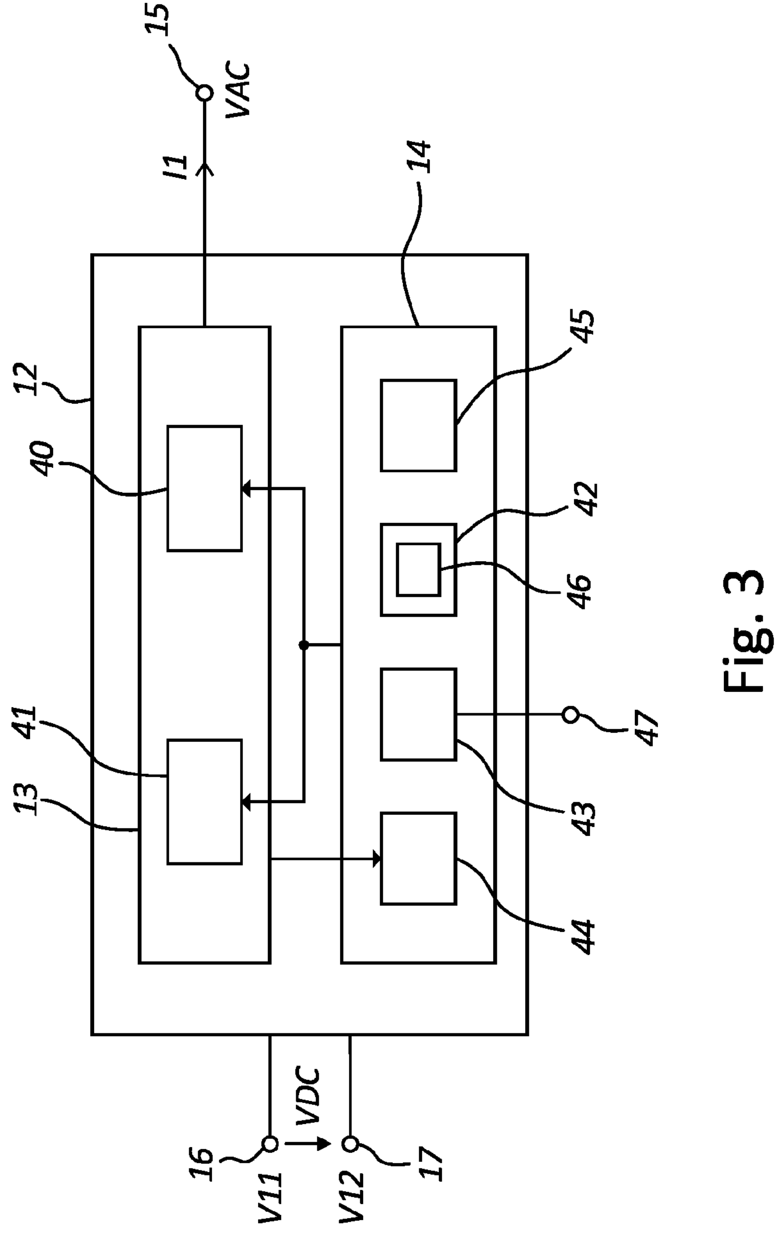
FIG. 3 shows a block diagram of a three-level or multi-level inverter circuit for an electric drive system in accordance with an aspect of the invention corresponding to FIG. 1.

FIG. 3 shows a block diagram of a three-level or multi-level inverter circuit for an electric drive system in accordance with the invention corresponding to FIG. 1.

The inverter circuit 12 comprises—as already explained with reference to the figure—two supply connections 16, 17, a load output 15, a three-level or multi-level inverter 13 as well as an operating mode setting device 14.

A first supply potential V11, e.g. a positive supply potential, can be tapped at the first supply connection 16. A second supply potential V12, e.g. a negative supply potential or a reference potential, can be tapped at the second supply connection 17. Therefore, a supply direct voltage VDC=V11−V12 is provided between the supply connections 16, 17.

At the load output 15, a multiphase load current I1 can be tapped, via which the various phases of the electric machine 11, which can be connected via the load output 15, are operated.

The controllable three-level or multi-level inverter 13 is arranged between the supply connections 16, 17 and the load output 15. The inverter 13 is designed to convert a direct voltage VDC received on the supply side into an alternating voltage VAC, in order to provide the multiphase load current I1 at the load output.

The inverter 13 has a first driver level 40 and at least one second driver level 41. The second driver level 41 is designed to carry output load currents to the load output 15 which are smaller than the output load currents provided by the first driver level 40.

The operating mode setting device 14 serves the purpose of setting and therefore controlling the operating mode of the inverter 13 and thus of the entire inverter circuit 12. In particular, the inverter 13 is designed to operate the inverter 13 either in a first operating mode in three-level or multi-level operation or in a second operating mode in two-level operation. It would also be feasible to have a third operating mode which includes a mixed form of two-level operation and three-level or multi-level operation. The third operating mode would be feasible and expedient in particular in the event of a transition from the first operating mode to the second operating mode and vice versa.

The operating mode setting device 14 controls the used operating mode of the inverter 13 depending upon the overall efficiency of the entire electric drive system 10. The overall efficiency is a function of the detected phase current of the electric machine 11 as well as at least one further parameter and/or one further property of the electric machine 11 which influence the overall efficiency.

For the purpose of setting the operating mode used in each case, the operating mode setting device 14 comprises at least one of the following devices:

an evaluation device 42;

a first measuring device 43;

a second measuring device 44;

a control device 45.

The evaluation device 42 is designed to optimise the overall efficiency of the electric drive system 10 on the basis of the phase current and of the at least one further parameter and/or property. This can be effected e.g. in situ, i.e. during the operation of the electric drive system 10. Preferably, however, the relatively computationally intensive calculation is carried out in advance, e.g. by means of suitable calculation (e.g. numerical or analytical) and/or using a specified family of characteristics. For example, the numerical efficiency calculation for 2L operation and 3L operation as well as the mapping of the function with decision output is effected in advance, i.e. offline. The selection of the better efficiency with the aid of the switching and the use of the lookup table for determining the efficiency can be performed also—but not exclusively—more or less dynamically during the operation.

For the purpose of optimisation, the evaluation device 42 has an optimisation module 46. The optimisation module 46 initially calculates the overall efficiency. Subsequently, the overall efficiency is optimised analytically or via a lookup table, e.g. via an optimisation function, taking into consideration the phase current as well as the at least one further parameter and/or property.

Furthermore, the operating mode setting device 14 also comprises first and/or second measuring devices 43, 44. The first measuring device 43 has e.g. at least one sensor input 47. In this regard, the operating mode setting device 14 can be coupled to the electric machine 11 via the sensor inputs 47 in order to record and detect electrical or physical parameters of the electric machine 11, such as for instance the phase current, the temperature and/or the rotor speed of the electrical machine 11. The second measuring device 44 is arranged in order to detect e.g. the temperature and/or the intermediate circuit voltage of the inverter 13. Furthermore, the supply voltage VDC can also be detected via the second measuring device 44.

The actual control of the inverter is effected via a control device 45 provided specifically for this purpose. The control device 45 sets the respective operating mode of the inverter 13, i.e. whether the inverter 13 is operated in three-level or multi-level operation or in two-level operation. The control device 45 can control e.g. the inverter 13 such that during three-level or multi-level operation both driver levels 40, 41 are activated and during two-level operation the second driver level 40 is deactivated.

Figure 4:
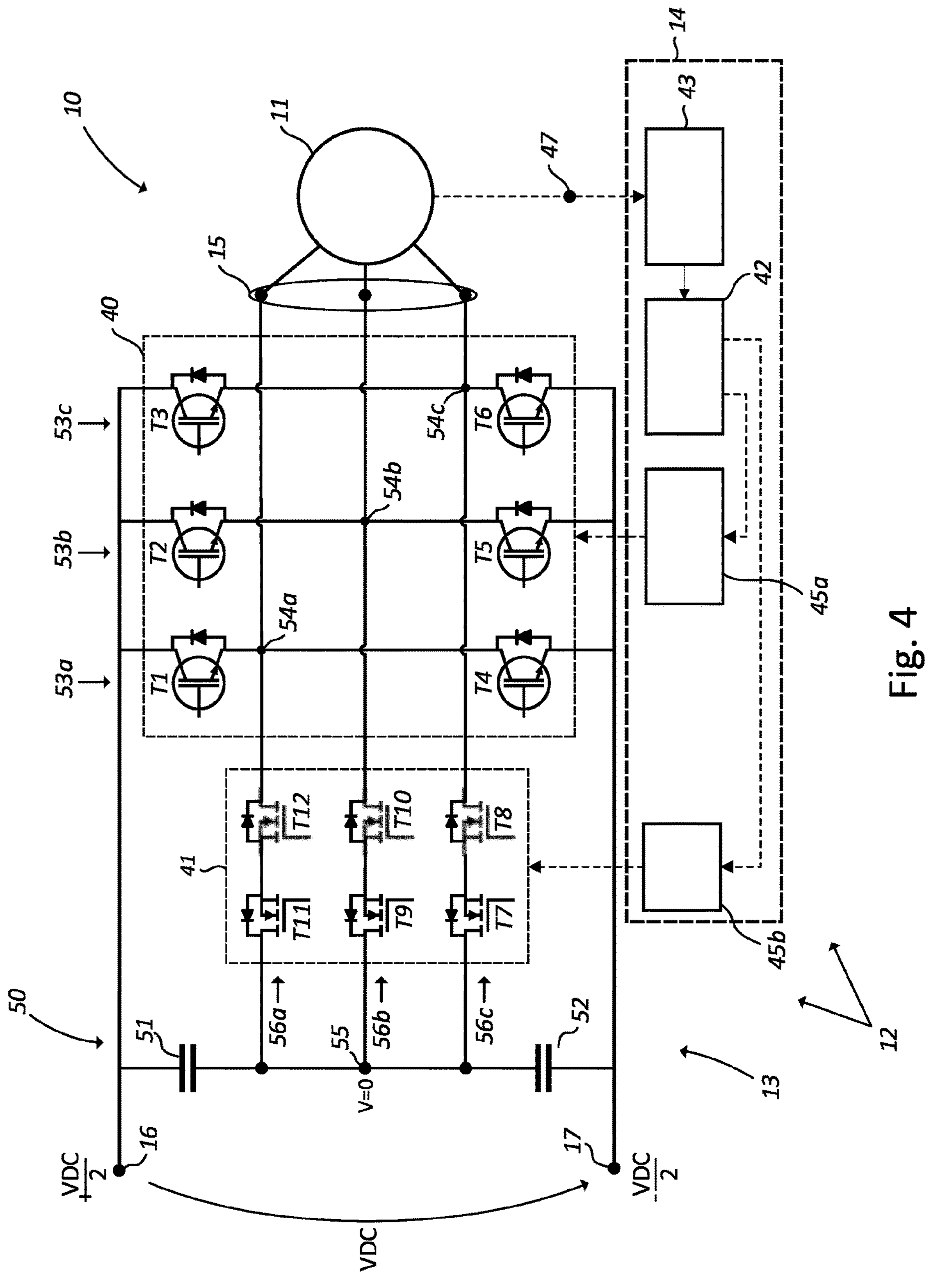
FIG. 4 shows a circuit diagram of an exemplified embodiment of an inverter circuit in accordance with an aspect of the invention.

FIG. 4 shows a circuit diagram of an exemplified embodiment of an inverter circuit in accordance with the invention.

The supply direct voltage VDC is provided at the supply connections 16, 17, wherein the supply potential V11=VDC/2 can be tapped at the first supply connection 16 and the supply potential V12=−VDC/2 can be tapped at the second supply connection 17. It would also be feasible to have a configuration, in which a reference potential, e.g. the potential of the reference ground GND, is provided at the second supply connection 17. In this case, it would be possible to tap the supply potential V11=VDC at the first supply connection 16.

An intermediate circuit 50 consisting of a series connection of two intermediate circuit capacitors 51, 52 is connected on the input side of the inverter 13. The intermediate circuit 50 functions as an energy storage device.

The inverter 13 illustrated in FIG. 4 includes a t-type neutral point clamped inverter architecture.

For this purpose, the first, outer driver level has, in the case of a 3-phase inverter shown, three half-bridge circuits 53*a*-53*c* which, in relation to the load paths thereof, are each likewise connected on the load side between the supply connections 16, 17. The respective centre taps 54*a*-54*c* of the half-bridge circuits 53*a*-53*c* each form an output load connection 15*a*-15*c* of the inverter 13. Each of the half-bridge circuits 53*a*-53*c* has in each case a first controllable power switch T1, T2, T3 which are designed as high-side switches. These first power switches T1, T2, T3 are connected to the first supply connection 16. The first power switches T1, T2, T3 are designed to provide a first voltage level at the load output 15. Furthermore, each of the half-bridge circuits 53*a*-53*c* has in each case a second controllable power switch T4, T5, T6 which are designed as low-side switches. These second power switches T4, T5, T6 are connected to the second supply connection 17. The second power switches T4, T5, T6 are designed to provide a second voltage level at the load output 15.

The second, inner driver level 41 is connected between the centre tap 55 of the intermediate circuit and the output load connections 15*a*-15*c*—and thus the respective centre taps 54*a*-54*c* of the half-bridge circuits 53*a*-53*c*. In the example shown, the second driver level 41 comprises in each case three circuit branches 56*a*-56*c*. Each of the circuit branches 56*a*-56*c* comprises a series circuit of two controllable power switches T7/T8; T9/T10; T11/T12 which are arranged anti-parallel in relation to the load paths thereof. The controllable power switches T7/T8; T9/T10; T11/T12 are designed to provide a third voltage level at the load output 15*a*-15*c*, said third voltage level being between the first and the second voltage level.

In order to activate the respective controllable power switches, the control device 45 has a first control unit 45*a* and a second control unit 45*b*. The first control unit 45*a* is designed to activate the power switches T1-T6 of the first driver level 40. The second control unit 45*b* is designed to activate the power switches T7-T12 of the second driver level 41.

In the exemplified embodiment in FIG. 4, the inverter 13 has a hybrid design. In this case, the power switches of the inverter 13 are not produced with the same semiconductor technology and/or are not of the same switch type. In particular, in the example shown the power switches T1-T6 are designed as Si-IGBTs having Si free-wheeling diodes. The power switches T7-T12 are designed as SiC-MOSFETs.

Alternatively (not shown in FIG. 4), the power switches T7-T12 can be designed as SiC-MOSFETs and the power switches T1-T6 can be designed as GaN-MOSFETs.

Alternatively (likewise not shown in FIG. 4), the power switches T7-T12 can be designed as IGBTs having a free-wheeling diode and the power switches T1-T6 can be designed as GaN power switches, in particular as GaN-MOSFETs.

Alternatively (likewise not shown in FIG. 4), in a so-called homogeneous inverter topology all power switches T1-T12 of the inverter 13 can be of the same switch type and/or can be produced with the same semiconductor technology, e.g. designed as GaN power switches, SiC power switches, such as for instance SiC-MOSFETs.

Figure 5:
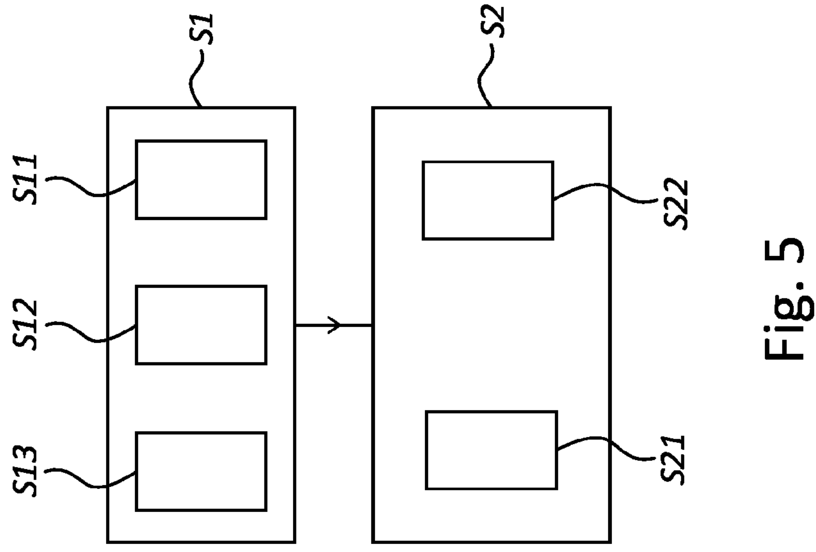
FIG. 5 shows a flow diagram of a method in accordance with an aspect of the invention for operating an electric drive system.

FIG. 5 shows a flow diagram of a method in accordance with the invention for operating an electric drive system. The electric drive system which can be e.g. a drive system corresponding to FIG. 1 has a synchronous machine equipped with a double rotor. The double-rotor is constructed from flux-carrying material consisting of solid material.

In a first step S1, the overall efficiency of the electric drive system is determined, e.g. offline. For this purpose, the phase current of the electric machine of the electric drive system is initially detected (S11). In addition, at least one further parameter (S12) and/or at least one further property (S13) of the electric machine which influence the overall efficiency is determined.

From all of this information, in a next step S2 the synchronous machine is operated. For this purpose, a controllable three-level or multi-level inverter circuit is used. The controllable three-level or multi-level inverter of the inverter circuit is operated in dependence upon the overall efficiency of the electric drive system and the parameters and properties influencing the overall efficiency, either both in the three-level or multi-level operating mode S21 or in the two-level operating mode S22.

It would also be feasible to have a mixed form of three-level or multi-level operation and two-level operation. Such a mixed form of operation would be feasible and advantageous e.g. during a transition from three-level or multi-level operation to two-level operation in order to avoid e.g. hard switching. The latter could be associated with losses and therefore efficiency losses.

Although the present invention has been described in full above with the aid of preferred exemplified embodiments, it is not limited thereto but can be modified in diverse ways.

LIST OF REFERENCE SIGNS

10 electric drive system
11 electric machine, synchronous machine
12 (three-level or multi-level) inverter circuit
13 (three-level or multi-level) inverter
14 operating mode setting device
15 load output
15*a*-15*c* output load connection
16, 17 supply connections
18 supply voltage source
20 double-rotor, double-rotor machine
21 outer rotor
22 inner rotor
23 stator
24, 25 magnets with opposite poles (of the outer rotor)
26 (outer) air gap
27 (outer) flux lines
28, 29 magnets with opposite poles (of the inner rotor)
30 (inner) air gap
31 (inner) flux lines
40 first (outer) driver level
41 second (inner) driver level
42 evaluation device
43 first measuring devices
44 second measuring devices
45 control device
46 optimisation module
47 sensor input
50 intermediate circuit
51, 52 intermediate circuit capacitors
53*a*-53*c* half-bridge circuit
54*a*-54*c* centre taps
55 centre tap
I1 (multiphase) load current
S1, S2 method steps
S11-S13 sub-steps
S21, S22 sub-steps
T1-T3 first power switches of the half-bridge circuit, high-side-switches
T4-T6 second power switches of the half-bridge circuit, low-side-switches
T7-T12 power switches
VAC (output-side) alternating voltage
VDC (input-side) direct voltage
V11 (positive) supply potential V11
V12 (negative) supply potential, reference potential

The invention claimed is:

1. An electric drive system for or in a motor vehicle, the electric drive system comprising:
at least one multiphase electric machine which comprises a synchronous machine with a double rotor, wherein the double rotor is constructed from flux-carrying material consisting of solid material,
a three-level or multi-level inverter circuit, which is coupled to a multiphase electric machine at a load output and which is designed to convert a direct voltage received on a supply side into an alternating voltage, via which the multiphase electric machine can be driven via the load output, wherein the inverter circuit has a controllable three-level or multi-level inverter
wherein the synchronous machine has a stator with an inductor, wherein the inductor is designed to carry a primarily radial magnetic flux, and wherein the inductor of the stator has a radial yoke thickness which is less than 30% of an overall radial inductor thickness.

2. The drive system of claim 1,
wherein the three-level or multi-level inverter circuit is configured for activation of the multiphase electric machine for the electric drive system, the three-level or multi-level inverter circuit further comprising:
two supply connections which can be coupled to a first and a second supply potential of a voltage supply,
a load output which comprises a load output connection for each phase of the multiphase electric machine and which can be coupled to the multiphase electric machine,
a controllable three-level or multi-level inverter disposed between the two supply connections and the load output and designed to convert the direct voltage received on the supply side into the alternating voltage to drive the multiphase electric machine connected to the load output,
an operating mode setting device which is designed to change the inverter from three-level or multi-level operation to two-level operation and vice versa depending on an overall efficiency of the electric drive system, wherein the overall efficiency is a function of a detected phase current of the electric machine as well as at least one further parameter or one further property of the electric machine which influence the overall efficiency.

3. The drive system of claim 1,
wherein the flux-carrying material in the rotor consists of iron or an iron alloy.

4. The drive system of claim 1,
wherein the inductor of the stator has a radial yoke thickness which is less than 20% of an overall radial inductor thickness.

5. The drive system of claim 1,
wherein the inductor of the stator has a radial yoke thickness which is less than 10% of an overall radial inductor thickness.

6. The drive system of claim 1,
wherein the synchronous machine is a three-phase synchronous machine and the inverter circuit is a three-phase inverter.

7. The drive system of claim 1,
wherein the multiphase electric machine is a wheel hub motor for an electrically operable motor vehicle.

8. A method for operating an electric drive system, which comprises a synchronous machine equipped with a double rotor, wherein the double rotor is constructed from a flux-carrying material consisting of solid material,
wherein the synchronous machine can be operated by means of a controllable three-level or multi-level inverter in dependence upon an overall efficiency of the electric drive system both in a three-level or multi-level operating mode and also in a two-level operating mode,
wherein the overall efficiency is determined from a detected phase current of a synchronous machine as well as at least one further parameter or property of the synchronous machine which influence the overall efficiency,
wherein the synchronous machine has a stator with an inductor, wherein the inductor is designed to carry a primarily radial magnetic flux, and wherein the inductor of the stator has a radial yoke thickness which is less than 30% of an overall radial inductor thickness.

* * * * *